(12) United States Patent
Heyer et al.

(10) Patent No.: US 8,651,453 B2
(45) Date of Patent: Feb. 18, 2014

(54) VALVE CARTRIDGE FOR A SOLENOID VALVE, AND ASSOCIATED SOLENOID VALVE

(75) Inventors: Klaus Heyer, Freiberg (DE); Reinhard Fink, Bietigheim-Bissingen (DE); Florian Richter, Hemmingen (DE); Jean-Guillaume Pic, Montreal (CA); Daniel Brenndoerfer, Talheim (DE); Volkmar Wetschorek, Argenbuehl (DE); Harald Speer, Freiberg (DE); Florian Rispler, Hirschegg (AU); Oliver Holz, Altenriet (DE); Friedrich Mueller, Immenstadt (DE); Nicolas Houis, Bietigheim-Bissingen (DE); Anton Fritz, Ofterschwang (DE); Alice Schacherl, Burgberg (DE); Franz Neuhauser, Bolsterlang (DE); Hubert Rapp, Sonthofen (DE); Martin Haas, Oberstenfeld (DE); Christoph Kasper, Charleston, SC (US); Joerg Fricke-Schmidt, Charleston, SC (US); Guenther Schnalzger, Blaichach (DE); Martin Kirschner, Blaichach (DE); Elmar Vier, Freiberg A.N. (DE); Stefan Eichmann, Kempten (DE); Jens Kolarsky, Bietigheim-Bissingen (DE); Gerhard Stokmaier, Markgroeningen (DE); Dietmar Kratzer, Tamm (DE); Kurt Mueller, Sonthofen (DE)

(73) Assignee: Robert Bosch GmbH, Stuttgart (DE)

( * ) Notice: Subject to any disclaimer, the term of this patent is extended or adjusted under 35 U.S.C. 154(b) by 589 days.

(21) Appl. No.: 12/742,218

(22) PCT Filed: Sep. 23, 2008

(86) PCT No.: PCT/EP2008/062676
§ 371 (c)(1),
(2), (4) Date: Jun. 30, 2010

(87) PCT Pub. No.: WO2009/059845
PCT Pub. Date: May 14, 2009

(65) Prior Publication Data
US 2010/0264342 A1    Oct. 21, 2010

(30) Foreign Application Priority Data

Nov. 8, 2007   (DE) .................... 10 2007 053 134

(51) Int. Cl.
*F16K 31/02* (2006.01)

(52) U.S. Cl.
USPC ............. 251/129.02; 251/129.15; 251/129.18

(58) Field of Classification Search
USPC .................. 251/129.02, 129.15, 360, 129.07, 251/129.18; 137/601.14, 601.2; 303/119.2
See application file for complete search history.

(56) References Cited

U.S. PATENT DOCUMENTS

| 2,698,159 | A | 12/1954 | Crum | |
|---|---|---|---|---|
| 5,718,489 | A * | 2/1998 | Megerle et al. | 303/119.2 |
| 6,189,985 | B1 * | 2/2001 | Fritsch et al. | 303/119.2 |
| 6,254,199 | B1 | 7/2001 | Megerle et al. | |
| 6,644,623 | B1 | 11/2003 | Voss et al. | |
| 6,742,764 | B1 * | 6/2004 | Volz | 251/129.02 |
| 6,789,779 | B2 * | 9/2004 | Wilde et al. | 251/129.15 |
| 6,851,536 | B2 * | 2/2005 | Orlamunder et al. | 192/48.8 |
| 6,976,665 | B2 * | 12/2005 | Seitz et al. | 251/129.07 |
| 2007/0030618 | A1 | 2/2007 | Heinz et al. | |

FOREIGN PATENT DOCUMENTS

| CN | 1087696 C | 7/2002 |
|---|---|---|
| CN | 2612577 Y | 4/2004 |
| CN | 1264710 C | 7/2006 |
| DE | 199 21 875 A1 | 11/2000 |
| DE | 199 51 665 A1 | 5/2001 |
| DE | 102006003490 A1 | 7/2007 |
| WO | 9809855 A1 | 3/1998 |
| WO | 2005012055 A1 | 2/2005 |
| WO | 2008058803 A1 | 5/2008 |

OTHER PUBLICATIONS

EPO Machine translation DE102006003490 Kratzer, Dietmar Jul. 2007.*

* cited by examiner

*Primary Examiner* — John K Fristoe, Jr.
*Assistant Examiner* — Kevin Barss
(74) *Attorney, Agent, or Firm* — Maginot, Moore & Beck

(57) ABSTRACT

The invention relates to a valve cartridge for a solenoid valve, having a capsule, a magnetic armature that is movably guided within the capsule, a valve insert that is inserted into the capsule at a first end, and a valve body, which is pressed into a second end of the valve insert and has a main valve seat. The magnetic armature, moved by a generated magnetic force, moves a tappet guided within the valve insert. The tappet has a closing element with a sealing element which plunges into the main valve seat of the valve body in a sealing manner for carrying out a sealing function, and an associated solenoid valve. According to the invention the valve insert is configured as a one-part slotted bushing, and the valve body is configured as a bonnet-shaped bushing. The valve body configured as a bushing is pressed into a second end of the valve insert configured as a slotted bushing such that the main valve seat is disposed within the valve insert.

18 Claims, 3 Drawing Sheets

VALVE CARTRIDGE FOR A SOLENOID VALVE, AND ASSOCIATED SOLENOID VALVE

CROSS-REFERENCE TO RELATED APPLICATION

This application is a 35 USC 371 application of PCT/EP2008/1062676 filed on Sep. 23, 2008.

BACKGROUND OF THE INVENTION

1. Field of the Invention

The invention relates to a valve cartridge for a solenoid valve and to an associated solenoid valve.

2. Description of the Prior Art

A conventional solenoid valve, in particular for a hydraulic assembly that is used for instance in an anti-lock brake system (ABS) or a traction control system (TC system) or an electronic stability program system (ESP system), is shown in FIG. 1. As seen in FIG. 1, the conventional solenoid valve 1, which is embodied for instance as a regulating valve that is open when without current, includes a magnet assembly 3 for generating a magnetic flux, and this assembly includes a housing jacket 3.1, a winding holder 3.2, a coil winding 3.3, and a cover disk 3.4; the solenoid valve also includes a valve cartridge 2, which includes a capsule 2.1, a valve insert 8 thrust by a first end into the capsule 2.1, a magnet armature 4 with a tappet 6, and a restoring spring 7. In the production of the conventional solenoid valve 1, the capsule 2.1 and the valve insert 8 of the valve cartridge 2 are joined together by pressing, and by means of a sealing weld 2.2, the valve cartridge 2 is sealed off hydraulically from the atmosphere. In addition, the valve insert 8 absorbs the compressive forces that occur in the hydraulic system and conducts them onward, via a calked flange 8.1 to a calked region 41 of a fluid block 40.

The magnet assembly 3, as a result of current being supplied to the coil winding 3.3, generates a magnetic force via electrical terminals 3.5, and this force moves the longitudinally movable magnet armature 4 with the tappet 6, which includes a closing element 6.1 with a main sealing element 6.2, against the valve insert 8 counter to the force of the restoring spring 7; the tappet 6 and the restoring spring 7 are guided in an inner bore of the valve insert 8. The valve insert 8 conducts the magnetic flux, introduced by the magnet assembly 3 via the cover disk 3.4, axially via an air gap 5 in the direction of the magnet armature 4. In addition, at a second end, the valve insert 8 receives the so-called valve body 9, which includes a main valve seat 9.1 into which the main sealing element 6.2, embodied as a sealing dome, in sealing fashion in order to implement the sealing function of the solenoid valve 1.

As can also be seen from FIG. 1, a lower valve part 10 is placed and braced axially against the valve insert 8 and includes a check valve 10.1 disposed eccentrically to the primary axis of the valve. The lower valve part 10, embodied for instance as a plastic insert, additionally serves to provide sealing of from the surrounding fluid block 40, to seal off the valve body 9, and to receive a flat filter 10.2.

In German Patent Disclosure DE 10 2006 003 490 A1, a solenoid valve is described which includes a magnet assembly, a capsule, a valve insert thrust into the capsule, and a tappet guided movably in an inner bore of the valve insert. The valve insert of the solenoid valve described is constructed of at least two segments, which in the assembled state form the inner bore for guiding the tappet and conducts a magnetic flux of the magnet assembly. In addition, the capsule is calked with a calked bush in a calked region to a fluid block, and a bushing is inserted with a sealing seat into the capsule in such a way that the sealing seat is displaced outside the valve insert.

Moreover, in German Patent Disclosure DE 10 2005 044 672 A1, a solenoid valve is described which includes a magnet assembly, a capsule, an armature, and a valve insert that conducts a magnetic flux, introduced by the magnet assembly, axially in the direction of the armature via an air gap. The capsule has a lower region, which is thrust in overlapping fashion onto the valve insert. The overlapping region of the capsule of the solenoid valve described is lengthened in the direction of a calked region, at which the capsule is calked with a calked bush to a fluid block. Moreover, a bushing with a sealing seat is inserted into the capsule in such a way that the sealing seat is disposed outside the valve insert.

ADVANTAGES AND SUMMARY OF THE INVENTION

The valve cartridge of the invention for a solenoid valve has the advantage over the prior art that a valve insert is embodied as a one-piece slit bushing, and a valve body is embodied as a hoodlike bushing; the valve body embodied as a bushing is press-fitted into a second end of the valve insert, embodied as a slit bushing, in such a way that the main valve seat is disposed inside the valve insert. As a result, the valve insert and the valve body can advantageously be used by means of economical production methods, with a constant power capacity of the valve cartridge. For instance, the valve insert embodied as a one-piece slit bushing can be produced for instance by curling of a sheet-metal strip, and the valve body can be produced for instance as a hoodlike deep-drawn part.

It is especially advantageous that a capsule of the valve cartridge is embodied as a valve component that seals off from the atmosphere and is calked to a fluid block in a calked region via a calked bush. As a result, the capsule also takes on the sealing function from the time the valve cartridge is calked in the fluid block. Since the capsule also takes on the sealing function toward the outside of the valve insert, the valve assembly can advantageously be simplified, so that a sealing weld between the capsule and the valve insert is no longer necessary.

In a feature of the valve cartridge of the invention, a later form of the inner bore of the valve insert can be made in a corresponding surface of the sheet-metal strip before the curling operation. This makes it possible for arbitrary favorable shapes for a volume compensation groove can be made, before the curling operation, by simple machining of the corresponding surface of the sheet-metal strip. Thus the corresponding surface of the sheet-metal strip can for instance be machined such that the inner bore of the valve insert, after the curling operation of the sheet-metal strip that forms the valve insert, has a set of inner teeth with a predeterminable number of teeth and/or with a predeterminable tooth shape or a predeterminable number of edges. The valve body embodied as a deep-drawn part is press-fitted into the valve insert for instance in a press-fitting region, and the main valve seat in the valve body is decoupled from the press-fit region via a decoupling region, which for instance has a decreasing outer diameter. As a result of the decoupling of the main valve seat from the press-fit region, deformation of the main valve seat by the press-fitting operation can advantageously be averted.

In a further feature of the valve cartridge of the invention, a restoring spring for a tappet is disposed outside the flow region, and the restoring spring is braced on a spring support clamping bushing. The spring support may for instance be embodied as a clamping bushing inserted into the valve insert as an integrally formed-on protrusion that constricts an effective diameter of the inner bore of the valve insert. Moreover, a lower valve part can be thrust via a dome sealingly into an interior of the valve body and with an outer contour can seal off from the surrounding fluid block.

In a further feature of the valve cartridge of the invention, a maximum stroke of the tappet is adjusted by means of an axial displacement of the valve insert inside the capsule. Moreover, a minimal air gap between the armature and the valve insert is adjusted by axial displacement of the valve body inside the valve insert with the armature in place. Moreover, the adjusted air gap can be defined by a crimped connection between the capsule and the valve insert. For producing the crimped connection, the valve insert is embodied for instance with an encompassing groove.

In a further feature of the valve cartridge of the invention, a reinforcing ring is pressed around the second end of the valve insert, in order to increase a design strength of the valve insert on press-fitting of the valve body. Alternatively, the seams of the valve insert embodied as a slit bushing can be joined together, at least on the second end of the valve insert, to increase the design strength of the valve insert on press-fitting of the valve body. The seams of the valve insert embodied as a slit bushing can joined together for instance by welding and/or adhesive bonding and/or meshing.

The valve cartridge of the invention may be used in a solenoid valve that is for instance open when without current, or closed when without current.

Advantageous embodiments of the invention described below along with conventional exemplary embodiments, described above for the sake of better comprehension of the invention, are shown in the drawings. In the drawings, the same reference numerals identify components and elements that perform the same or analogous functions.

BRIEF DESCRIPTION OF THE DRAWINGS

The invention will be described below in conjunction with the accompanying drawings, in which.

DESCRIPTION OF THE PREFERRED EMBODIMENTS

Figure 1:
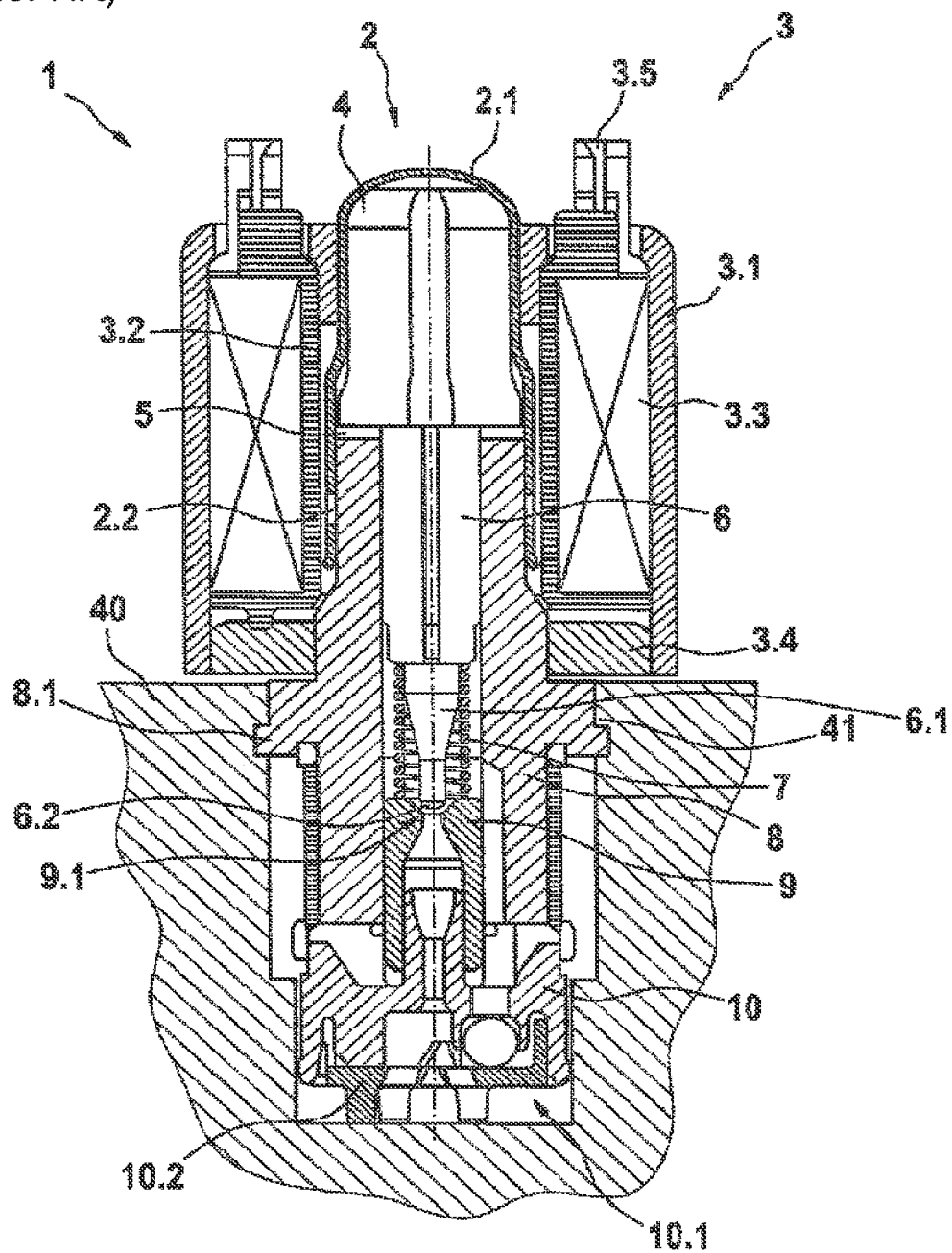
FIG. 1 shows a schematic sectional view of a conventional solenoid valve.
Figure 2:
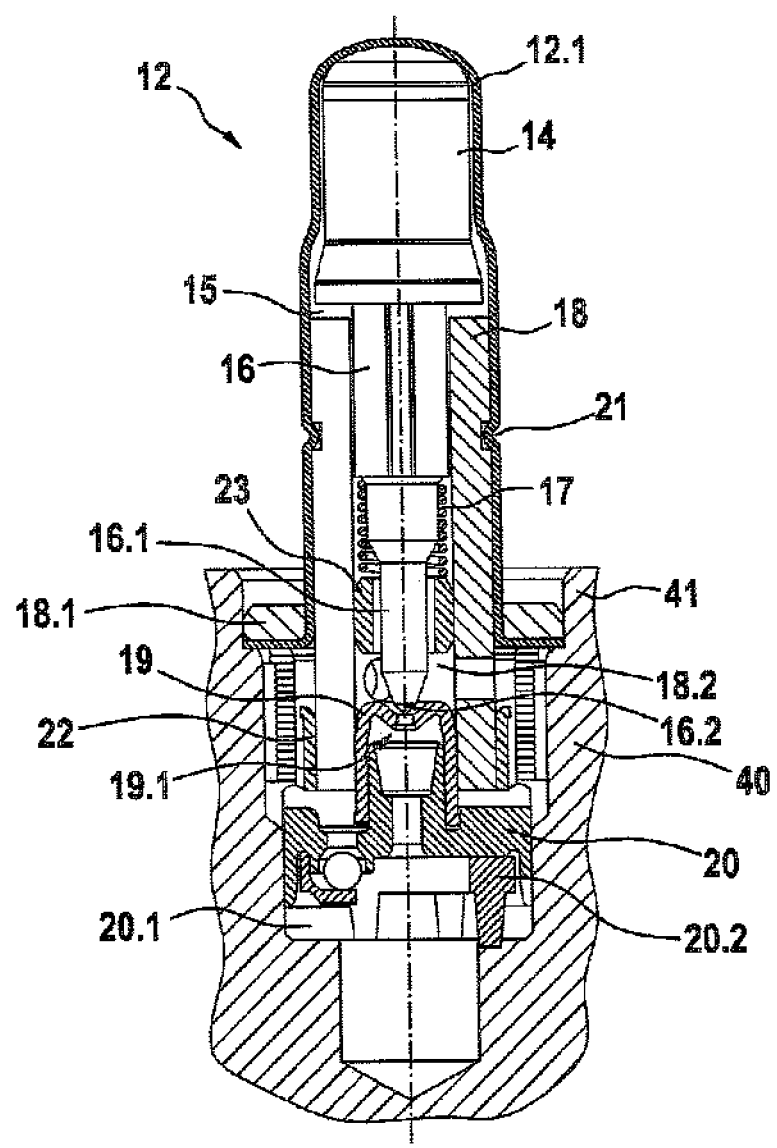
FIG. 2 shows a schematic sectional view of one exemplary embodiment of a valve cartridge of the invention for a solenoid valve.
Figures 3, 6:
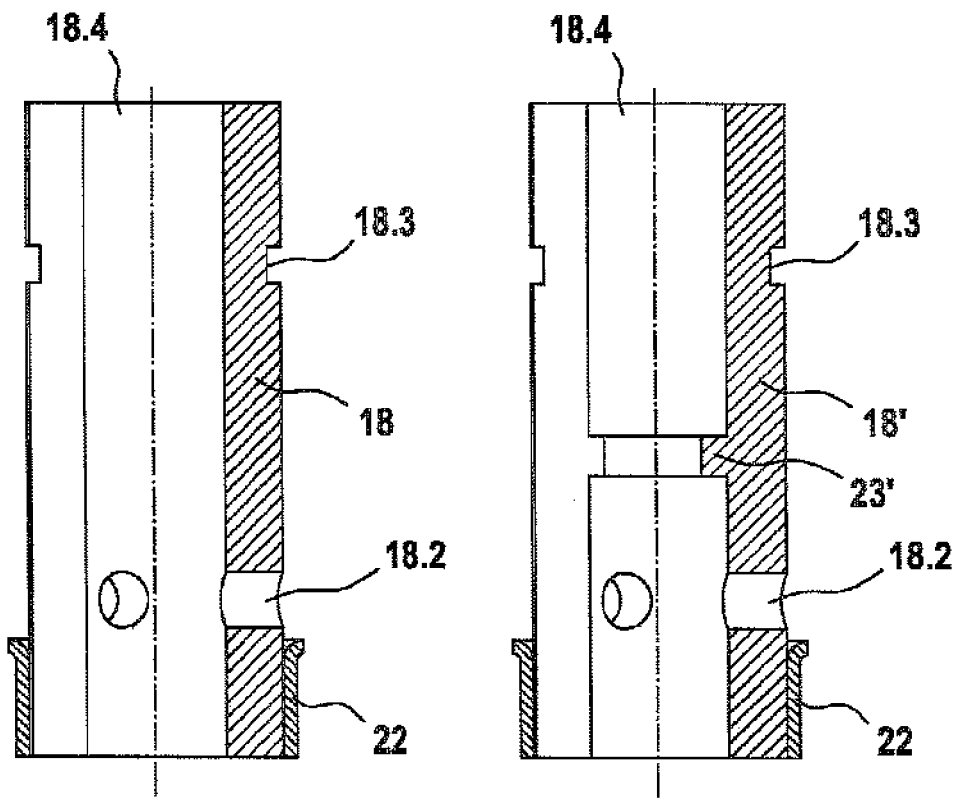
FIG. 3 shows a schematic sectional view of a first exemplary embodiment of a valve insert for the valve cartridge of FIG. 2.
FIG. 6 shows a schematic sectional view of a second exemplary embodiment of a valve insert for the valve cartridge of FIG. 2.
Figure 4:
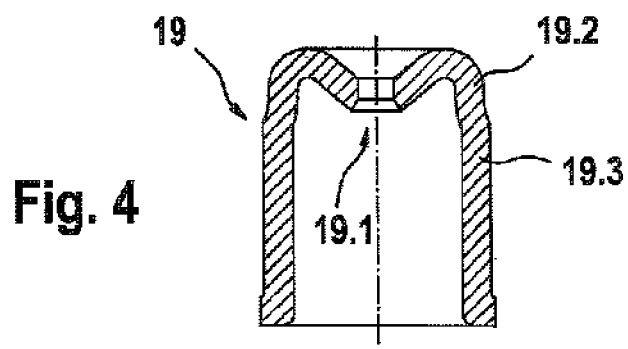
FIG. 4 shows a schematic sectional view of a valve body for the valve cartridge of FIG. 2.

As can be seen from FIGS. 2 through 4, one exemplary embodiment of a valve cartridge 12 according to the invention for a solenoid valve includes a capsule 12.1, a magnet armature 14 guided movably inside the capsule 12.1, a valve insert 18 that is thrust by a first end into the capsule 12.1, and a valve body 19 with a main valve seat 19.1. A tappet 16 is guided longitudinally movably inside the valve insert 18 and has a closing element 16.1, with a sealing element 16.2 that for performing a sealing function plunges sealingly into the main valve seat 19.1 of the valve body 19. The tappet 16 may be moved by the magnet armature 14, counter to the force of a restoring spring 17, inside the valve insert 18, and magnet armature 14 is moved by a magnetic force that is generated by a magnet assembly, not shown. The magnet assembly may for instance be embodied analogously to the magnet assembly 3 of the conventional solenoid valve 1 of FIG. 1.

As can also be seen from FIG. 2, the capsule 12.1, as a valve component that seals off from the atmosphere, can be lengthened in the direction of the region 41 that is calked to a fluid block 40. The calking forces are therefore no longer absorbed by the valve insert but rather by a calked bush 18.1. The calking geometry is optimized to such an extent that a calking process can be employed that permits a reduced calking force; as a result, the forces of deformation that act on the calked bush 18.1 and the capsule 12.1 can be reduced.

As can also be seen from FIGS. 2 and 3, the valve insert 18 is embodied as a one-piece slit bushing. The valve insert 18 embodied as a one-piece slit bushing can be produced for instance by curling a sheet-metal strip. In the exemplary embodiment shown, an inner bore of the valve insert 18 has a completely circular shape or a very close approximation thereof, in which the tappet 16 is guided. To compensate for the volume that the tappet 16 positively displaces upon its axial motion caused by the magnetic flux introduced from the magnet assembly, and for ventilation and filling, at least one axially extending volume compensation groove is machined into the tappet 16. Alternatively, however, the at least one volume compensation groove may also be machined into the inner bore of the valve insert 18. In an alternative embodiment, not shown, of the valve cartridge of the invention, at least one axially extending volume compensation groove can for instance be machined into the valve insert 18 and can be predetermined by the shape of the inner bore of the valve insert. The later shape of the inner bore of the valve insert 18 may be made in a corresponding surface of the sheet-metal strip before the curling operation, for instance. The axially extending volume compensation grooves can be generated for instance by machining a set of inner teeth into the inner bore of the valve insert 18. The set of inner teeth may have an arbitrarily predeterminable number of teeth and/or an arbitrarily predeterminable tooth shape. The set of inner teeth is machined, before the curling operation, into a corresponding surface of the sheet-metal strip, so that the inner bore of the valve insert 18 is created with the desired set of inner teeth after the operation of curling the sheet-metal strip. Alternatively, the axially extending volume compensation grooves can be created by making a plurality of edges in the inner bore of the valve insert 18. The edges are made, before the curling operation, in a corresponding surface of the sheet-metal strip, so that after the curling of the sheet-metal strip, the inner bore of the valve insert 18 has the desired shape of an internal polygon or an internal orbiform curve.

As can also be seen in FIGS. 2 and 4, the valve body 19 is embodied as a hoodlike bushing. The valve body 19 embodied as a bushing is embodied for instance as a deep-drawn part and is press-fitted via a press-fit region 19.3 into a second end of the valve insert 18 embodied as a slit bushing in such a way that the main valve seat 19.1 is disposed inside the valve insert 18. Via a decoupling region 19.2, the main valve seat 19.1 in the valve body 19 is decoupled from the press-fit region 19.3, in order to prevent deformation of the main valve seat 19.1 from the operation of press-fitting the valve body 19 into the valve insert 18. As can also be seen from FIG. 4, the outer diameter of the decoupling region 19.2, beginning at the diameter of the press-fit region 19.3, tapers in the direction of the hoodlike end of the valve body 19 having the main valve seat 19.1.

The hydraulic forces are absorbed by the valve insert 18 embodied as a slit bushing. To prevent widening of the valve insert 18 as a result of the press-fitting of the valve body 19, in the exemplary embodiment shown a reinforcing ring 22 is pressed onto the second end of the valve insert 18. The pressed-on reinforcing ring 22 advantageously increases the design strength of the valve insert 18 upon press-fitting of the valve body 19. In an alternative embodiment, not shown, of the valve cartridge 12 of the invention, the seams of the valve insert 18 embodied as a slit bushing can be joined together on at least the second end of the valve insert 18, to increase the design strength of the valve insert 18 upon press-fitting of the valve body 19. For instance, the seams of the valve insert 18 embodied as a slit bushing may be joined together by welding and/or adhesive bonding and/or meshing.

In the exemplary embodiment shown of the valve cartridge of the invention, a maximum stroke of the tappet 16 can be adjusted by means of an axial displacement of the valve insert 18 inside the capsule 12.1. A minimal air gap 15 between the magnet armature 14 and the valve insert 18 can be adjusted by means of axial displacement of the valve body 19 inside the valve insert 18 with the armature 14 in place. The adjusted air gap 15 can be defined by means of a crimped connection 21 between the capsule 12.1 and the valve insert 18, and for producing the crimped connection 21, the valve insert 18 can be embodied with an encompassing groove 18.3. Thus the crimped connection 21 ensures that the working air gap 15 is preserved, and in addition, the hydraulically acting forces can be absorbed. The shape of the encompassing groove 18.3 can be geometrically altered and adapted in order to increase the axial retention forces of the crimped connection between the capsule 12.1 and the valve insert 18.

Figure 5:
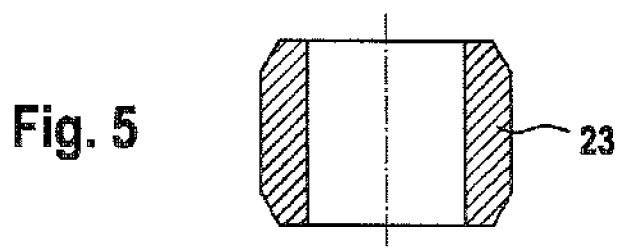
FIG. 5 shows a schematic sectional view of a clamping bushing for the valve insert of FIG. 3.

As can also be seen from FIG. 2, the restoring spring 17 for the tappet 16 is disposed outside the flow region, and the restoring spring 17 is braced on a spring support 23, which in the exemplary embodiment shown is embodied as a clamping bushing that is introduced into the valve insert 18 and is shown in FIG. 5. By shifting the restoring spring 17 out of the installation space through which there is a flow, the wear at the tappet 16 can be reduced, and the flow rate between the main valve seat 19.1 and corresponding radial bores 18.2 made in the valve insert 18 can be increased.

Alternatively, as can be seen from FIG. 6, the spring support may be embodied as an integrally formed-on protrusion 23', which constricts an effective diameter of the inner bore 18.4 of the valve insert 18'. The spring support 23', embodied as a protrusion, of the valve insert 18 can for instance be formed on, before the curling operation, in a corresponding surface of the sheet-metal strip. The formed-on spring support 23' may be embodied for instance as a protruding transverse rib or as a plurality of protruding lugs.

As can also be seen from FIG. 2, a lower valve part 20 embodied as a plastic insert is placed and braced axially against the valve insert 18, and the lower valve part 20 is thrust via a dome sealingly into an interior of the valve body 19 and with its outer contour seals off from the surrounding fluid block 40. In addition, the lower valve part 20 shown includes an eccentrically disposed check valve 20.1, which performs a directionally oriented flow function. In addition, the lower valve part 20 receives a flat filter 20.2.

By means of the valve cartridge according to the invention, individual components can be greatly simplified, so that advantageously, the corresponding production processes can be simplified and made more economical as well. Furthermore, as a result of the mode of construction of the valve cartridge of the invention as a bushing, a reduced structural height of the solenoid valve above the fluid block can advantageously be attained, which can have a favorable effect on the aggregate box volume. Moreover, even inside the fluid block, a reduced structural height of the solenoid valve can result, as a result of which the thickness of the fluid block can be reduced, so that further advantages can be attained with regard to the weight and the aggregate box volume.

The foregoing relates to the preferred exemplary embodiments of the invention, it being understood that other variants and embodiments thereof are possible within the spirit and scope of the invention, the tatter being defined by the appended claims.

The invention claimed is:

1. A valve cartridge for a solenoid valve, having a capsule, a magnet armature guided movably inside the capsule, a valve insert which is thrust by a first end into the capsule, and a valve body having a main valve seat, the magnet armature, moved by a generated magnetic force, moves a tappet guided inside the valve insert, which tappet has a closing element with a sealing element for performing a sealing function which plunges sealingly into the main valve seat of the valve body, the valve insert being a one-piece cylindrical body defining a slit therethrough extending along the entire length thereof, and the valve body including a hoodlike portion in press-fit engagement with a second end of the valve insert, the hoodlike portion defining the main valve seat disposed inside the valve insert.

2. The valve cartridge as defined by claim 1, wherein the capsule is embodied as a valve component that provides sealing off from surrounding atmosphere and is calked to a fluid block via a calked bush in a calked region.

3. The valve cartridge as defined by claim 2, characterized in that the valve body is embodied as a deep-drawn part having a press-fit region that is press-fit into the valve insert and a decoupling region between the main valve seat and the press-fit region to decouple the main valve seat from the press-fit region.

4. The valve cartridge as defined by claim 2, characterized in that the valve insert is a sheet-metal strip defining said one-piece cylindrical body.

5. The valve cartridge as defined by claim 4, characterized in that an inner bore of the cylindrical body of the valve insert includes a number of grooves defined along the length thereof 6. The valve cartridge as defined by claim 1, wherein the valve insert is a sheet-metal strip defining said one-piece cylindrical body.

7. The valve cartridge as defined by claim 6, wherein an inner bore of the cylindrical body of the valve insert includes a number of grooves defined along the length thereof.

8. The valve cartridge as defined by claim 1, wherein the valve body is embodied as a deep-drawn part having a press-fit region that is press-fit into the valve insert and a decoupling region between the main valve seat and the press-fit region to decouple the main valve seat from the press-fit region.

9. The valve cartridge as defined by claim 1, wherein a restoring spring of the tappet is disposed within said valve insert outside a flow region, and the restoring spring is braced on a spring support engaged within said valve insert.

10. The valve cartridge as defined by claim 9, wherein the spring support is embodied as a clamping bushing that is introduced into the valve insert.

11. The valve cartridge as defined by claim 9, wherein the spring support is embodied as an integrally formed-on protrusion, which constricts an effective diameter of an inner bore of the valve insert.

12. The valve cartridge as defined by claim 1, further comprising a lower valve part that is braced axially against the valve insert, and that includes a dome that is thrust sealingly into an interior of the valve body and an outer contour configured to seal off against a surrounding fluid block.

13. The valve cartridge as defined by claim 1, wherein a maximum stroke of the tappet can be adjusted by means of an axial displacement of the valve insert inside the capsule.

14. The valve cartridge as defined by claim 1, wherein a minimal air gap between the armature and the valve insert can be adjusted by means of axial displacement of the valve body inside the valve insert with the armature inserted.

15. The valve cartridge as defined by claim 14, wherein an adjusted air gap is defined by means of a crimped connection between the capsule and the valve insert.

16. The valve cartridge as defined by claim 15, wherein the valve insert, for producing the crimped connection, is embodied with an encompassing groove.

17. The valve cartridge as defined by claim 1, wherein a reinforcing ring is pressed around the second end of the valve insert, in order to increase a design strength of the valve insert upon press-fitting in the valve body.

18. A solenoid valve, comprising:
   a valve cartridge as defined in claim 1;
   a magnetic actuator magnetically coupled to the magnet armature; and
   a fluid block supporting said valve cartridge and including a fluid inlet and a fluid outlet with the valve body of said valve cartridge disposed between the inlet and outlet.

\* \* \* \* \*